United States Patent

[11] 3,607,187

| | | |
|---|---|---|
| [72] | Inventor | Harold A. McMaster<br>Woodville, Ohio |
| [21] | Appl. No. | 789,795 |
| [22] | Filed | Jan. 8, 1969 |
| [45] | Patented | Sept. 21, 1971 |
| [73] | Assignee | Permaglass, Inc.<br>Millbury, Ohio |

[54] METHOD AND APPARATUS FOR RESHAPING GLASS SHEETS
25 Claims, 6 Drawing Figs.

[52] U.S. Cl. .................................................. 65/106,
65/25 A, 65/182 A, 65/273, 65/287
[51] Int. Cl. ...................................................... C03b 23/02
[50] Field of Search .......................................... 65/25 A,
104, 106, 107, 110, 119, 182 A, 273, 287

[56] References Cited
UNITED STATES PATENTS
3,177,060  4/1965  Pedersen ........................ 65/273 X Primary Examiner—Arthur D. Kellogg
Attorney—Barnard, McGlynn and Reising ABSTRACT: A method and apparatus for curving a sheet of glass wherein a substantially flat sheet of glass is conveyed through a heating means and removed from the conveyor by a mold means having a curved surface with a vacuum supplied thereto for pulling the sheet thereagainst to curve the sheet. The mold means is then moved through the apparatus to move the sheet to a cooler medium where it is replaced on conveyor means. There is also included a cooling means. In one embodiment the conveying means comprises an endless loop conveyor extending through the heating means and through the cooling means, and the mold means moves into the cooling means and replaces the curved sheet onto the conveyor in the cooling means. In a second embodiment the conveying means includes an endless loop conveyor in the heating means only and an endless frame or ring is disposed exteriorly of a cooling means so that the mold means lifts the sheet of glass from the loop conveyor with the vacuum and then moves to place the curved sheet of glass on the frame which in turn moves into the cooling means for cooling the sheet of glass.

INVENTOR.
Harold A. McMaster
BY
Barnard, McGlynn & Reising
ATTORNEYS

PATENTED SEP 21 1971 3,607,187

INVENTOR.
Harold A. McMaster
BY
Barnard, McGlynn & Reising
ATTORNEYS

METHOD AND APPARATUS FOR RESHAPING GLASS SHEETS

This invention relates to a method and apparatus for curving a sheet of material such as glass.

There are various methods by which sheets of glass are curved or bent. One method is to place a flat sheet of glass between opposed complementary molds which are moved together to press the sheet of glass into the desired curvature. Another is to float a sheet of glass on gases over a bed while moving the sheet of glass along the bed which changes in curvature to the desired curvature of the sheet of glass. One of the deficiencies with the latter method is that a sheet of glass can only be curved with 1° of curvature and cannot be compoundedly curved. Another method is to utilize an endless ring or frame to press a sheet of glass against a convex mold and to thereafter move the sheet of glass away from the mold and into a cooling medium with the frame.

It is an object and feature of this invention to provide an improved and alternative method and apparatus for curving a sheet of glass wherein the tolerances in the curvature of the curved sheets of glass are maintained within very close limits.

Another object and feature of this invention is to provide a method and apparatus wherein a sheet of glass is moved from a heating means to a cooling means by a vacuum means which holds the sheet against the force of gravity.

In correlation with the foregoing object and feature, it is another object and feature of this invention to provide a method and apparatus wherein a heated sheet of glass is conveyed through a heating means by a conveying means and a mold is placed adjacent the sheet of glass with a vacuum applied to the mold surface to move the sheet of glass against the mold surface for curving the sheet and thereafter replacing the sheet of glass on the conveying means for movement in a cooling means.

In correlation with the foregoing objects and features, it is another object and feature to provide alternative method and apparatus wherein the mold means moves the curved sheet of glass into a cooling means before replacing the sheet on the conveying means or wherein the mold means replaces the sheet of glass on an endless loop frame of the conveying means which in turn moves the sheet of glass into the cooling means.

Other objects and attendant advantages of the present invention will be readily appreciated as the same becomes better understood by reference to the following detailed description when considered in connection with the accompanying drawings wherein.

Referring now to the drawings wherein like numerals indicate like or corresponding parts throughout the several views, an apparatus for treating and curving sheets of material such as glass is generally shown at 10 in FIG. 1 and at 10' in FIG. 4.

Figure 1:
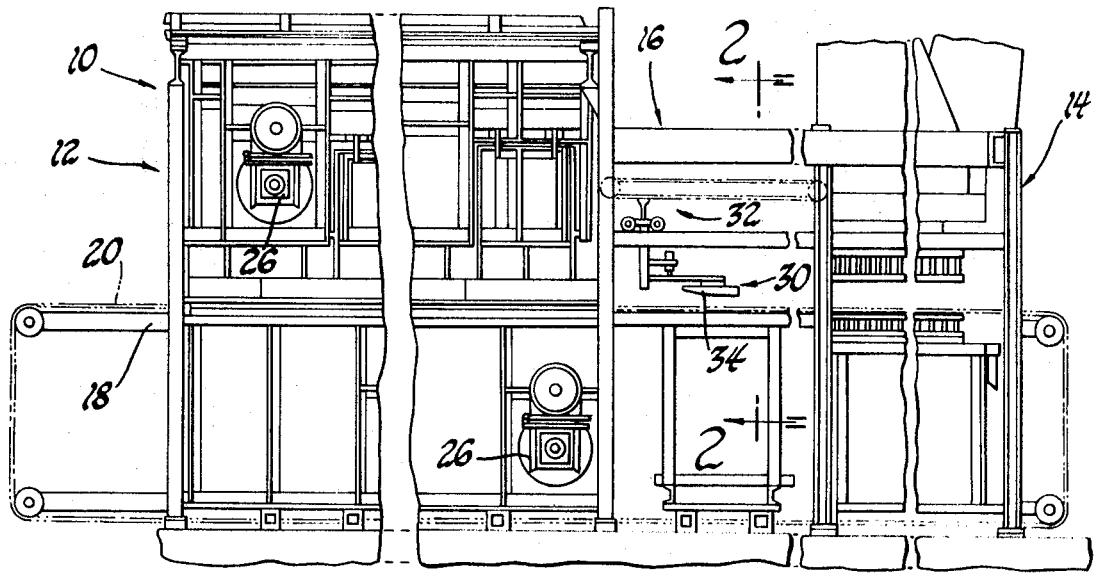
FIG. 1 is a side elevation view of a first preferred embodiment of an apparatus constructed in accordance with the instant invention.

Each of the embodiments includes a heating means including a furnace 12 through which sheets of glass are conveyed while being heated to a softened or deformation temperature. There is also included a cooling means comprising a blasthead generally indicated at 14 for cooling the curved sheets of glass. An intermediate or bending station 16 is disposed between the furnace 12 and blastheat 14 and is a part of the heating means in that means are included in the station 16 for heating the sheets of glass. In fact, the temperature in the station 16 is frequently higher than in the furnace 12. Heat may be supplied in station 16 by hot gases from gas burners or by electrical radiant heaters, neither of which are shown for purposes of clarity, but which are well known in the art. The furnace 12 includes a support bed 18 which, in the embodiment of FIG. 1, extends through the furnace 12, the station 16, and to the blasthead 14, and which, in the embodiment of FIG. 4, extends only through the furnace 12.

Figure 4:
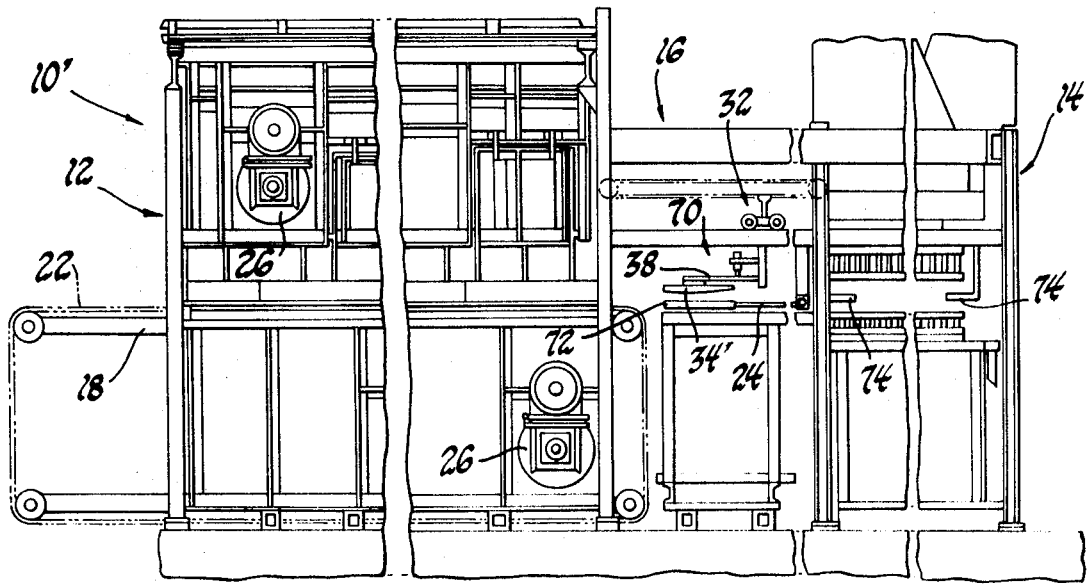
FIG. 4 is a side elevational view of a second preferred embodiment of an apparatus constructed in accordance with the instant invention.

Each embodiment includes a conveying means which, in the embodiment of FIG. 1, comprises the belt-type conveyor 20 and which, in the embodiment of FIG. 4, comprises the belt-type conveyor 22 and the conveyor assembly including the frame 24 and the means or members 74 for moving the sheet in the blasthead 14.

The support bed 18 is of the type having a plurality of inlets and exhausts communicating with the upper surface thereof so that gases may be supplied over the surface of the bed. The belt-type conveyors 20 and 22 are preferably of the type comprising interconnected or woven metal strips defining openings in the conveyor through which gases pass for heating and/or supporting the sheets of glass.

In both embodiments, the support bed 18 extends from the furnace 12 to provide a loading station. The conveyors 20 and 22 move a sheet of glass along the bed 18 and through the furnace toward the second end of the furnace. The furnace includes the blowers 26 for circulating hot gases within the furnace for heating and supporting the sheets of glass as they move through the furnace.

Referring now more specifically to the embodiment of FIG. 1. The apparatus 10 includes a vacuum mold means generally indicated at 30 and disposed above the conveyor 20 and movable to a position adjacent to the conveyor 20 for removing a sheet of glass therefrom and curving the sheet. That is, the vacuum mold means 30 removes a sheet from the conveyor 20 and curves the sheet as the sheet is held thereagainst and against the force gravity by a vacuum and replaces the sheet on the conveyor 20. There is also included actuation means, generally indicated at 32 in FIG. 1 and shown generally in FIGS. 2 and 3, for moving the mold means 30 horizontally along the apparatus 10. The conveyor 20 is an endless loop conveyor which extends through the furnace 12, through the intermediate station 16, and through the blasthead 14. The actuation means 32 moves the mold means 30 horizontally along the apparatus 10 to remove a sheet of glass from the conveyor in the intermediate station 16 and to move the sheet into the blasthead 14 where the sheet is replaced onto the conveyor 20. Thus, the vacuum mold means moves the sheet from the heating means to the cooling means.

The mold means 30 includes a mold 34 having a lower surface and passages therein in communication with the lower surface for supplying a vacuum to the lower surface to remove a sheet of glass from the conveyor 20 and to conform the sheet of glass under the force of the vacuum to the curvature of lower surface. The mold 34 is supported on a crossmember 36. The crossmember 36 is attached to a pair of cantilevered members 38 which extend in a direction from the furnace 12 toward the blasthead 14. The cantilevered members 38 are secured to trapozoidal-shaped blocks 30 which are in turn vertically slidable in dovetail grooves 42 in vertical supports 44. The vertical supports 44 depend from a beam 46. The beam 46 is attached at opposite ends to the members 48. The members 48 are supported by the rollers 50. The rollers 50 are in rolling engagement with the horizontal beams 52. The beams 52 are supported by the uprights 54. Chain sprockets 56 are rotatably supported by the uprights 54 and a chain 58 is entrained around each pair of sprockets 56. A reversible electric motor (not shown) drives one of the sprockets 56 on each side of the furnace. Each chain 58 is connected through a member 60 to one of the members 48. An arm 62 depends from the beam 46 and supports a fluid actuator 64 which has the piston thereof attached to a member (not shown) extending between the cantilevered members 38.

In operation, a sheet of glass is placed upon the conveyor 20 at the loading station and moves into the furnace 12 and is heated to deformation temperature. As the sheet of glass reaches deformation temperature and approaches the intermediate or bending station 16, it is supported on gases in spaced relationship and above the upper extremities of the conveyor 20, as is disclosed and claimed in the aforementioned copending application. As the sheet of glass is moved by the conveyor 20 beneath the mold 34, the fluid actuator 64 is operated to move the cantilevered members 38 downwardly relative to the vertical supports 44 so as to move the mold 34 into engagement with the sheet of glass. A vacuum is applied through the passages in the mold 34 to the lower surface thereof to conform the sheet of glass to the curvature of the lower surface and to hold the sheet of glass thereagainst. The fluid actuator 64 is then again actuated to move the mold 34 upwardly. The electric motor which drives the sprockets 56 is then actuated to move the chain 58 which, through the members 60, moves the mold 34 into the cooling means or blasthead 14 as the rollers 50 roll along the beams 52. Once the mold 34 is in the blasthead 14, the actuator 64 is again actuated to lower the mold 34 and to place the sheet of glass on the conveyor 20 as the vacuum in the passages of the mold is discontinued. At this point the sheet of glass is sufficiently rigid to prevent it from being marred when coming into contact with the conveyor 20. The conveyor 20 then moves the sheet of glass in the blasthead as it is additionally cooled and/or tempered.

Referring now to the embodiment of FIG. 4; as alluded to above, the conveying means in the embodiment of FIG. 4 includes not only an endless loop conveyor 22, which extends only through the furnace 12, but, in addition, a conveyor assembly including the frame means 24 and the members 74. The embodiment of FIG. 4 also includes a vacuum mold means generally indicated at 70. The frame means 24 includes an endless loop frame or ring 72 for receiving a curved sheet from the mold 34'. The frame 72 is movable from a position outside of the cooling means or blasthead 14 to a position within the blasthead 14 where the sheet of glass is removed therefrom by the members 74. The members 74 are a means for moving or oscillating the sheet in the cooling means or blasthead 14.

Figure 2:
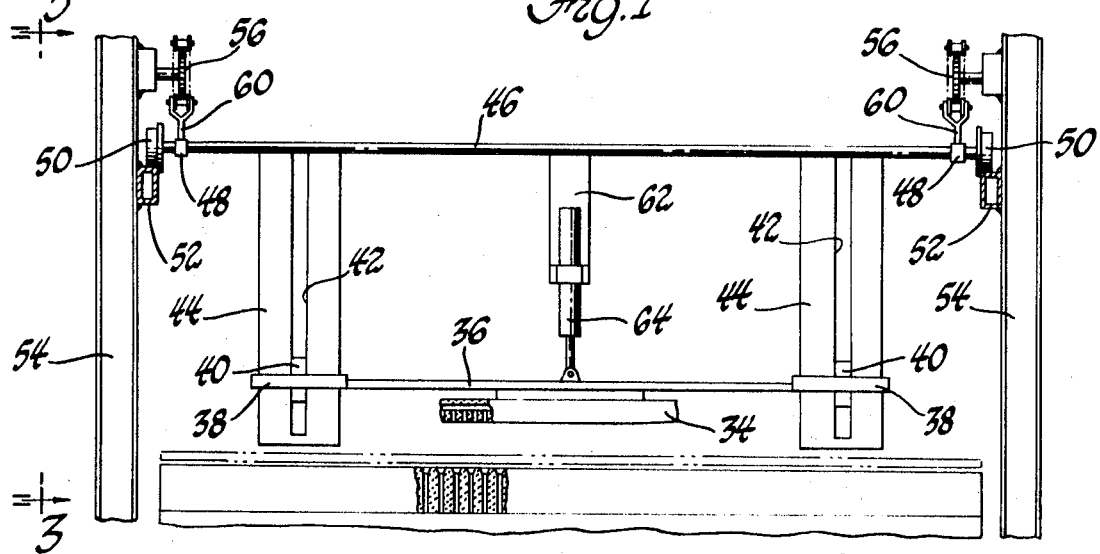
FIG. 2 is an enlarged fragmentary cross-sectional view taken substantially along line 2—2 of FIG. 1.
Figure 3:
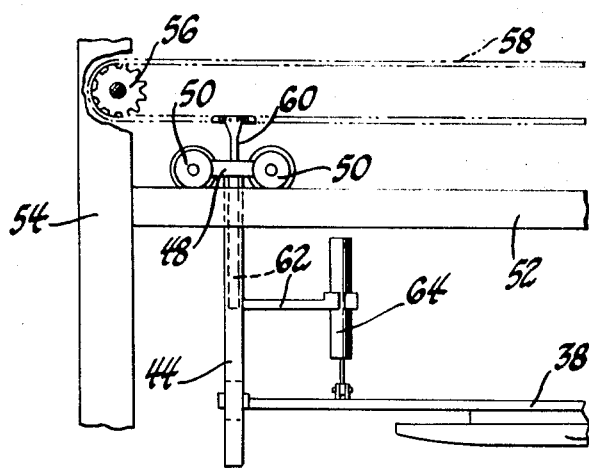
FIG. 3 is a fragmentary partially broken away view taken substantially along line 3—3 of FIG. 2.

The mold means 70 and the actuation means 32 in the embodiment of FIG. 4 utilizes all of the same components as in the embodiment of FIG. 1 except that the cantilevered members 38 extend in the opposite direction in that they extend in a direction from the blasthead 14 toward the furnace 12. In other words, the components are the same as illustrated in FIGS. 1, 2, and 3 except that the relative position of the various components is reversed. The actuation means moves the mold 34' along the apparatus to remove a sheet of glass from the conveyor 22 and onto the frame 72 for movement into the cooling means or blasthead 14. The frame 72 is an endless loop having an upper surface contoured to the surface of the mold 34' for receiving a curved sheet of glass therefrom.

In operation, the actuation means 32 shown in FIG. 4 moves the mold 34' into the furnace 12 and lowers the mold 34' to a position adjacent a sheet of glass where the sheet of glass is removed from the conveyor 22 under the force of the vacuum. Thereafter the sheet of glass is moved out of the furnace 12 into the intermediate station 16 which is, as stated above, also heated and a part of the heating means. Once the mold 34' is in the intermediate station 16, it is lowered to place the sheet of glass on the ring frame 72 at which time the vacuum is discontinued so that the sheet of glass is supported on the ring frame 72. Thereafter the ring frame 72 is moved into the cooling means or blasthead 14 where the sheet of glass is further cooled and removed from the frame 72 by the members 74. The actuation and movement of the frame 72 and the members 74 is more specifically disclosed and claimed in copending application Ser. No. 691,326 filed Dec. 18, 1967, in the name of Harold A. McMaster and assigned to the assignee of the instant invention. The advantage in utilizing the embodiment of FIG. 4 is that very large sheets of glass may be curved and placed on the ring frame 72 and moved into the cooling or tempering medium by the ring 72 without changing shape.

Figure 5:
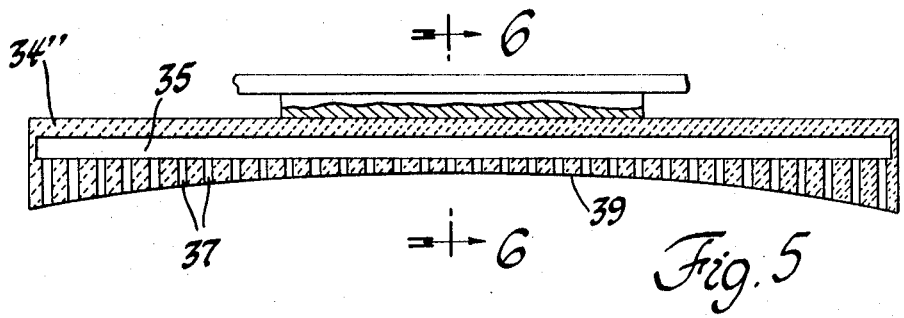
FIG. 5 is a fragmentary cross-sectional view of a mold means having a concave surface for utilization in the instant invention.
Figure 6:
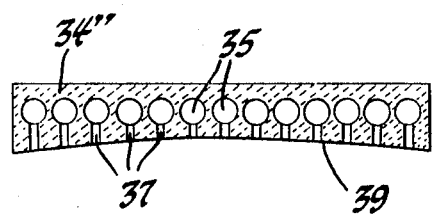
FIG. 6 is a cross-sectional view taken substantially along line 6—6 of FIG. 5.

In FIGS. 1 and 4 the molds 34 and 34' are shown as convex. In FIGS. 5 and 6 there is shown a concave mold 34'. The mold 34' has passages 35 and 37 for supplying a vacuum to the lower surface 39 of the mold. Thus, the mold means may employ a mold having either a concave or convex surface. Although the invention has been described in connection with curving or bending sheets of glass, it will be understood that the invention may also be utilized to heat treat a sheet of flat glass by moving the sheet of flat glass from a heating means to a cooling means with a vacuum means.

There is disclosed herein, therefore, a method for treating a sheet of glass by moving the sheet from a heating means to a cooling means with a vacuum means. More specifically, a method of curving a sheet of glass which comprises heating the sheet and moving a vacuum mold means adjacent the sheet for moving the sheet thereagainst to curve the sheet and thereafter moving the mold means with the sheet thereagainst into a cooler environment. In a more specific sense, the method includes conveying a sheet through a heating means with a conveying means and removing the sheet from the conveying means with a vacuum mold to curve the sheet and replacing the sheet on the conveying means with the mold. In the embodiment of FIG. 1 the method may be further defined as removing the sheet of glass from the conveyor 20 in the furnace 12 of the heating means and thereafter moving the sheet into the cooling means or blasthead 14 and then replacing the sheet on the conveyor 20. In the embodiment of FIG. 4, the method may be more specifically defined as removing the sheet of glass from the conveyor 22 in the heating means or furnace 12 and replacing the sheet on the ring frame 72 of the conveying assembly at a position exteriorly of the cooling means or blasthead 14 and thereafter moving the sheet into the cooling means or blasthead 14 while supported on the ring frame 72 and moving the sheet in the blasthead 14 with the members or means 74 of the conveyor assembly.

In both embodiments a method is performed including heating a substantially flat sheet and disposing a curved surface adjacent the sheet and applying a vacuum thereto for moving the sheet against the surface to curve the sheet and thereafter moving the sheet into a cooler medium while held against the surface by the vacuum.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the present invention in which an exclusive property or privilege is claimed are defined as follows:

1. An apparatus for curving a sheet of material such as glass comprising; heating means for heating the sheet, cooling means for cooling the sheet, conveying means for moving a sheet in said heating means and in said cooling means, vacuum mold means for removing a sheet from said conveying means and forming the sheet and for replacing the sheet on said conveying means, said conveying means comprising an endless loop conveyor which extends through said heating means and into said cooling means.

2. An apparatus as set forth in claim 1 including actuation means for moving said mold means horizontally along said apparatus to remove a sheet from said conveyor and into said cooling means and onto said conveyor.

3. An apparatus as set forth in claim 2 wherein said heating means includes a support bed over which said conveyor moves, said conveyor extending across said support bed and having openings therethrough and gas supply means for supplying gases over said support bed and through said openings in said conveyor.

4. An apparatus as set forth in claim 3 wherein said mold means has a surface and passages therein for supplying a vacuum thereto for holding a sheet against said surface.

5. An apparatus for curving a sheet of material such as glass comprising; heating means for heating the sheet, cooling means for cooling the sheet, conveying means for moving a sheet in said heating means and in said cooling means, vacuum mold means for removing a sheet from said conveying means and forming the sheet and for replacing the sheet on said conveying means, said conveying means comprising a conveyor for moving the sheet in said heating means and a conveyor assembly for moving the sheet in said cooling means, said vacuum mold means being operable to move a sheet from said conveyor to said conveyor assembly, said conveyor comprising an endless loop conveyor which extends through at least a portion of said heating means and said conveyor assembly including a frame for receiving the sheet from said mold means and movable from a position outside of said cooling means to a position within said cooling means.

6. An apparatus as set forth in claim 5 including actuation means for moving said mold means horizontally along said apparatus to remove a sheet from said conveyor and onto said frame for movement into said cooling means.

7. An apparatus as set forth in claim 6 wherein said frame is an endless loop having an upper surface contoured to the surface of said mold for receiving a curved sheet therefrom.

8. An apparatus as set forth in claim 7 wherein said heating means includes a support bed over which said conveyor moves, said conveyor extending across said support bed and having openings therethrough, and gas supply means for supplying gases over said support bed and through said openings in said conveyor.

9. An apparatus as set forth in claim 8 wherein said mold means has a surface and passages therein for supplying a vacuum thereto for holding a sheet against said surface.

10. An apparatus as set forth in claim 9 wherein said conveyor assembly also includes means in said cooling means for receiving the sheet from said frame and for moving said sheet in said cooling means.

11. An apparatus for forming a sheet of material such as glass comprising: an elongated enclosed furnace, conveying means for moving a sheet through said furnace, heating means for heating the sheet in said furnace, and vacuum mold means adjacent one end of said furnace and movable vertically to lift a heat softened sheet upwardly against gravity solely through a vacuum, said vacuum mold means including a surface with passages therein for applying a vacuum thereover to hold the sheet thereto for lifting the sheet and for forming the sheet to said surface.

12. An apparatus as set forth in claim 11 including cooling means adjacent said one end of said furnace for cooling the sheet, said vacuum mold means being operable to move the sheet into said cooling means.

13. An apparatus as set forth in claim 11 including actuation means for moving said vacuum means horizontally along said apparatus.

14. An apparatus as set forth in claim 11 including cooling means adjacent said one end of said furnace for cooling the sheet, said conveying means being operable to move the sheet in said furnace and in said cooling means, said vacuum mold means being operable to remove the sheet from said conveying means and forming the sheet and replacing the sheet on said conveying means.

15. An apparatus as set forth in claim 11 including cooling means adjacent said one end of said furnace for cooling the sheet, said conveying means comprising a conveyor for moving the sheet in said furnace and a conveyor assembly for moving the sheet in said cooling means, said vacuum means being operable to move a sheet from said conveyor to said conveyor assembly.

16. A method of forming a sheet of material such as glass comprising the steps: conveying the sheet through an elongated enclosed furnace with conveying means, heating the sheet in said furnace, lifting a heat-softened sheet vertically upward against gravity solely by a vacuum applied through passages in a vacuum mold surface positioned adjacent the sheet to lift the sheet as the sheet is formed to the vacuum mold surface.

17. The method as set forth in claim 16 including moving the vacuum mold means with the sheet thereagainst into a cooler environment for cooling the sheet.

18. The method as set forth in claim 17 including curving the sheet by forming the sheet to a mold surface which is curved.

19. The method as set forth in claim 16 including lifting the sheet from the conveying means with the vacuum mold means to form the sheet and replacing the sheet on the conveying means with the mold means.

20. The method as set forth in claim 19 further defined as replacing the sheet on the conveying means in a cooling means.

21. The method as set forth in claim 19 further defined as removing the sheet from the conveying means in the heating means and thereafter moving the sheet into a cooling means and then replacing the sheet on the conveying means.

22. The method as set forth in claim 19 further defined as removing the sheet from a conveyor of the conveying means in the heating means and replacing the sheet on a conveyor assembly of the conveying means at a position exteriorly of the heating means.

23. The method as set forth in claim 22 further defined as moving the sheet in a cooling means with the conveyor assembly for cooling of the sheet.

24. The method as set forth in claim 19 further defined as removing the sheet from a conveyor of the conveying means in the heating means and replacing the sheet on a frame of the conveying means at a position exteriorly of the heating means.

25. The method as set forth in claim 24 further defined as moving the sheet into a cooling means with the frame for cooling of the sheet.